(No Model.)

L. P. CONVERSE.
SUPPORT FOR COOKING UTENSILS.

No. 533,439. Patented Feb. 5, 1895.

Witnesses:
Chas. E. Gaylord,
C. G. Timmerman.

Inventor:
Lyman P. Converse.
By Dyrenforth & Dyrenforth,
Attys.

UNITED STATES PATENT OFFICE.

LYMAN P. CONVERSE, OF CHICAGO, ILLINOIS.

SUPPORT FOR COOKING UTENSILS.

SPECIFICATION forming part of Letters Patent No. 533,439, dated February 5, 1895.

Application filed November 2, 1893. Serial No. 489,868. (No model.)

*To all whom it may concern:*

Be it known that I, LYMAN P. CONVERSE, a citizen of the United States, residing at Chicago, in the county of Cook and State of Illinois, have invented a new and useful Improvement in Supports for Cooking Utensils, of which the following is a specification.

My invention relates to a device to be used on or in connection with a stove or other means for producing heat for cooking purposes, the function of which shall be to afford heat sufficient for slow cooking in kettles and other similar utensils without danger of burning the contents by interposing a protector or chamber between the flame or the plate in contact with the flame and the cooking utensil.

The invention consists in a plate having the form of an inverted pie-plate, namely, with the lateral edges turned up to present a flange, and provided in such flange with a series of perforations. The center of the plate is depressed to present a concavity, all for a purpose hereinafter described.

Figure 1:
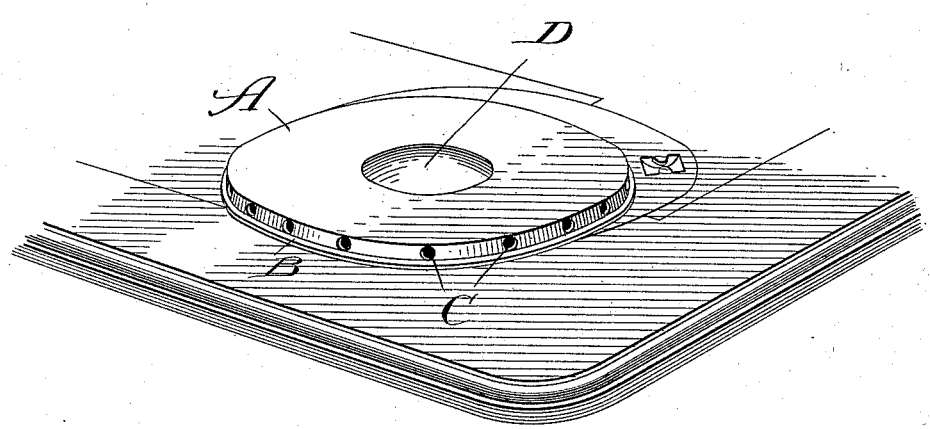
Figure 2:
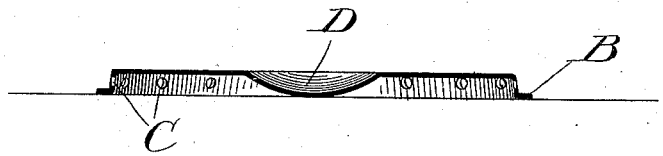

In the drawings Figure 1 is a view of a section of a stove showing my device in use; and Fig. 2 is a vertical transverse section taken through the protector showing its mode of construction.

The protector comprises a circular imperforate plate A having the flange-like side B, in which side are provided numerous perforations C. The center of the plate A is depressed, as shown at D. The purpose of the depression D is mainly to afford a central support for the plate. It also serves to deflect the air current entering and passing out through the perforations C.

In use the plate in the inverted position shown in the figures is placed upon the stove, preferably out of contact with the flame, as by placing it on the stove-lid; but it may be placed in contact with the flame, especially when used in connection with a gas stove. The air entering the perforations C serves to produce in the plate a uniform heat sufficient for heating kettles for slow cooking, as in the cooking of farinaceous food, and at the same time prevents the plate from becoming heated so high as to be objectionable.

What I claim as new, and desire to secure by Letters Patent, is—

As a new article of manufacture a support for a cooking utensil formed from a single sheet of metal, having the circular imperforate plate A, central depression D and depending flange-like side B provided with perforations C, substantially as described.

LYMAN P. CONVERSE.

In presence of—
  M. J. FROST,
  W. N. WILLIAMS.